(12) United States Patent
Wehmeier et al.

(10) Patent No.: US 9,230,103 B2
(45) Date of Patent: Jan. 5, 2016

(54) SYSTEM AND METHOD FOR REGISTERING USERS FOR COMMUNICATING INFORMATION ON A WEB SITE

(75) Inventors: Doug H Wehmeier, San Francisco, CA (US); Alexander F Mehr, San Francisco, CA (US); Shayan G Zadeh, San Francisco, CA (US)

(73) Assignee: Zoosk, Inc., San Francisco, CA (US)

( * ) Notice: Subject to any disclaimer, the term of this patent is extended or adjusted under 35 U.S.C. 154(b) by 278 days.

(21) Appl. No.: 13/485,640

(22) Filed: May 31, 2012

(65) Prior Publication Data

US 2013/0139224 A1 May 30, 2013

Related U.S. Application Data

(60) Provisional application No. 61/627,830, filed on Oct. 18, 2011, provisional application No. 61/626,828, filed on Oct. 3, 2011.

(51) Int. Cl.
*G06F 21/00* (2013.01)
*H04L 29/06* (2006.01)
*G06F 21/55* (2013.01)

(52) U.S. Cl.
CPC .......... *G06F 21/552* (2013.01); *H04L 63/0884* (2013.01)

(58) Field of Classification Search
CPC .................................................. H04L 63/0884
USPC ............................................................ 726/4
See application file for complete search history.

(56) References Cited

U.S. PATENT DOCUMENTS

| | | | |
|---|---|---|---|
| 7,606,918 B2 * | 10/2009 | Holzman et al. | 709/229 |
| 2007/0192608 A1 * | 8/2007 | De Arruda Villela | 713/176 |
| 2010/0005518 A1 | 1/2010 | Tirpak et al. | |
| 2011/0093701 A1 | 4/2011 | Etchegoyen | |
| 2011/0107421 A1 | 5/2011 | Mahone et al. | |

FOREIGN PATENT DOCUMENTS

KR  10-2011-0067747 B1   6/2011

OTHER PUBLICATIONS

WIPO, International Search Report, mailed Mar. 28, 2013, Korea.
WIPO, Written Opinion of the International Searching Authority, mailed Mar. 28, 2013, Korea.

* cited by examiner

*Primary Examiner* — Longbit Chai
(74) *Attorney, Agent, or Firm* — Innovation Partners; Charles E. Gotlieb (57) ABSTRACT

A system and method blocks or removes user accounts or complex information of user accounts that has or have a correspondence with complex information of other accounts or complex information on a blacklist.

21 Claims, 3 Drawing Sheets

BLOCK OR REMOVE COMPLEX INFORMATION/ EXISTING ACCOUNT(S): PREVENT USER FROM POSTING OR SENDING COMMUNICATIONS TO OTHER USERS OF THE WEB SITE, OTHER USERS CAN NOT VIEW REGISTRATION INFORMATION, ADD COMPLEX INFORMATION TO BLACKLIST

SYSTEM AND METHOD FOR REGISTERING USERS FOR COMMUNICATING INFORMATION ON A WEB SITE

RELATED APPLICATIONS

This application claims the benefit of U.S. Provisional Patent Application Ser. No. 61/627,830 entitled "Method and Apparatus for Registering Users for Communicating Information on a Web Site", filed by Doug Wehmeier, Alexander Mehr and Shayan Zadeh on Oct. 18, 2011, and is related to the subject matter of U.S. Provisional Patent Application Ser. No. 61/626,828, entitled "Method and Apparatus for Validating Users Using Social Network Information" filed by Alexander Mehr and Shayan Zadeh on Oct. 3, 2011, each having the same assignee as the present application and each is hereby incorporated by reference in its entirety.

FIELD OF THE INVENTION

The present invention is related to computer software and more specifically to computer software for registering users on a web site.

BACKGROUND OF THE INVENTION

Web sites may require a user to register in order to send communications to other users of the web site or to post communications to other users using the web site. New ways of registration on such web sites are desirable.

SUMMARY OF INVENTION

A system and method accepts simple and complex registration information. Simple registration information (also referred to as simple information) is information that is simple to compare side by side to determine a correspondence. Simple registration information includes text and other information that, for each piece of information supplied by a user of a website, is small enough to compare to determine whether that piece of information is identical to the same piece of information supplied by a million other users in a fraction of a second using a conventional personal computer system. Complex registration information (also referred to as complex information) includes information for which such a comparison may not be possible with certainty in such time or may not be possible at all, and includes digital photographs, digital video or digital audio.

A signature of some or all of the complex registration information is generated. The signature may produced using any conventional technique that distills an amount of information into a smaller amount of information. Such techniques may include conventional hash techniques, sampling techniques (e.g. copying every $1000^{th}$ byte from the complex registration information into the signature) or more processing intensive techniques such as identifying characteristics such as those used in conventional facial or speech recognition. The signature of some or all of the complex information is compared to the signatures of the corresponding complex information of some or all of the other users of a web site to identify any existing accounts for which a correspondence exists between the complex information of the new user and the complex information of the existing account with a confidence level that exceeds a threshold. If the threshold is 100%, then the correspondence is a match, and lower than that amount is a similarity. Any value of a threshold above zero may be used.

If the correspondence between the complex information of the new user and the complex information of any other existing users does not exceed the threshold, the account of the user of the information corresponding to the signature generated is allowed, enabling that user to send or post communications to other users of the same web site, and the signature is stored for subsequent comparisons with signatures of other users registering with the web site. Although one signature is described, any number of signatures may be used.

If the correspondence between the complex information of the new user and the complex information of any other user or a set of blacklisted information exceeds the threshold, in one embodiment, the new account for which the new user has registered or the complex information itself is disallowed or blocked. Different actions may be taken based on how many times the user has supplied complex information that was previously blocked or disallowed. If the account is disallowed or blocked, the user is prevented from sending or posting communications to other users of the same web site to which the user is attempting to register and if the complex information is disallowed or blocked, just that information is unavailable for viewing by other users of the web site to which the new user registered. In another embodiment, if the correspondence between the complex information of the user and any other user exceeds the threshold, the complex information of the user registering and the other users for which the signatures have a correspondence that exceeds the threshold are compared using such complex information directly, i.e. using the data from the complex information, rather than using or just using the signatures, and again a level of correspondence is identified. If the level of the correspondence exceeds a threshold, the new account is disallowed or blocked, or the complex information itself is disallowed or blocked at one or both accounts.

In one embodiment, in the event that the new account is disallowed, a check is made to the existing account or accounts to which the correspondence was identified to determine if it appears the account or accounts were set up for a malicious intent or purpose, such as to make available or send spam type communications or malicious type communications. For example, the communications sent or posted from that account may be checked for similarity with other communications sent from that account or for the presence of certain keywords associated with communications sent from malicious accounts or expected to be sent from malicious accounts, and a score is assigned indicating similarity of prior communications and/or the presence of keywords. If the score exceeds a threshold, a human may optionally investigate and determine if the account is being used for malicious purposes such as advertising or to annoy other users. In one embodiment, to determine if the account is being used for malicious purposes, the user's social network account information may be checked either using social network information of the user and the user's friends or in using such information in conjunction with the registration information the user provided as described above, as described in more detail in U.S. Provisional Patent Application 61/626,828 entitled "Method and Apparatus for Validating Users Using Social Network Information" filed by Alexander Mehr and Shayan Zadeh on Oct. 3, 2011, having the same assignee as the present application and is hereby incorporated by reference in its entirety. If the score exceeds the threshold, (and optionally if the investigation results in a finding that the account is being used for malicious purposes), the existing account may be blocked or removed, preventing that user from sending or posting communications to other users of the web site and preventing their registration information from being viewed.

The allowed account may be used to post or send communications to people who log in to view such communications via personal computers such as cellular telephones via the Internet. Persons with blocked or removed accounts may not post or send communications and may also not be able to view communications from other users.

DETAILED DESCRIPTION OF A PREFERRED EMBODIMENT

Figure 1:
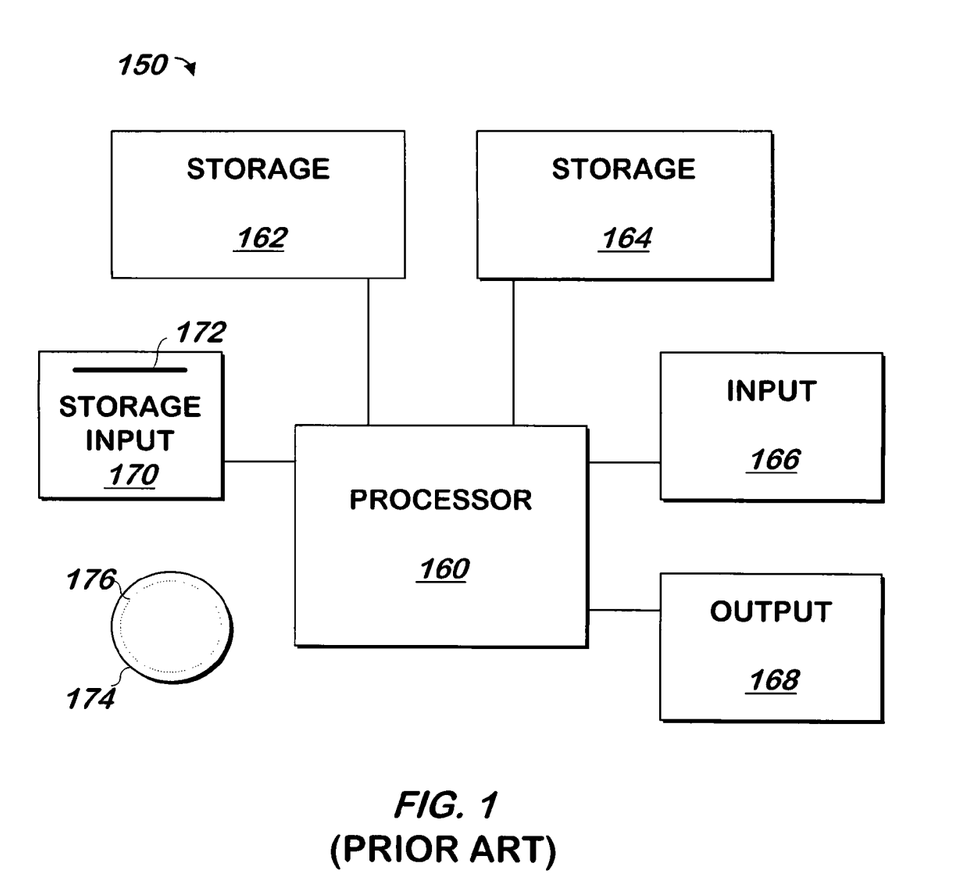
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS SPARC ENTERPRISE M9000 SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, 7, or VISTA) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Receive Request to Open New Account.

Figure 2A:
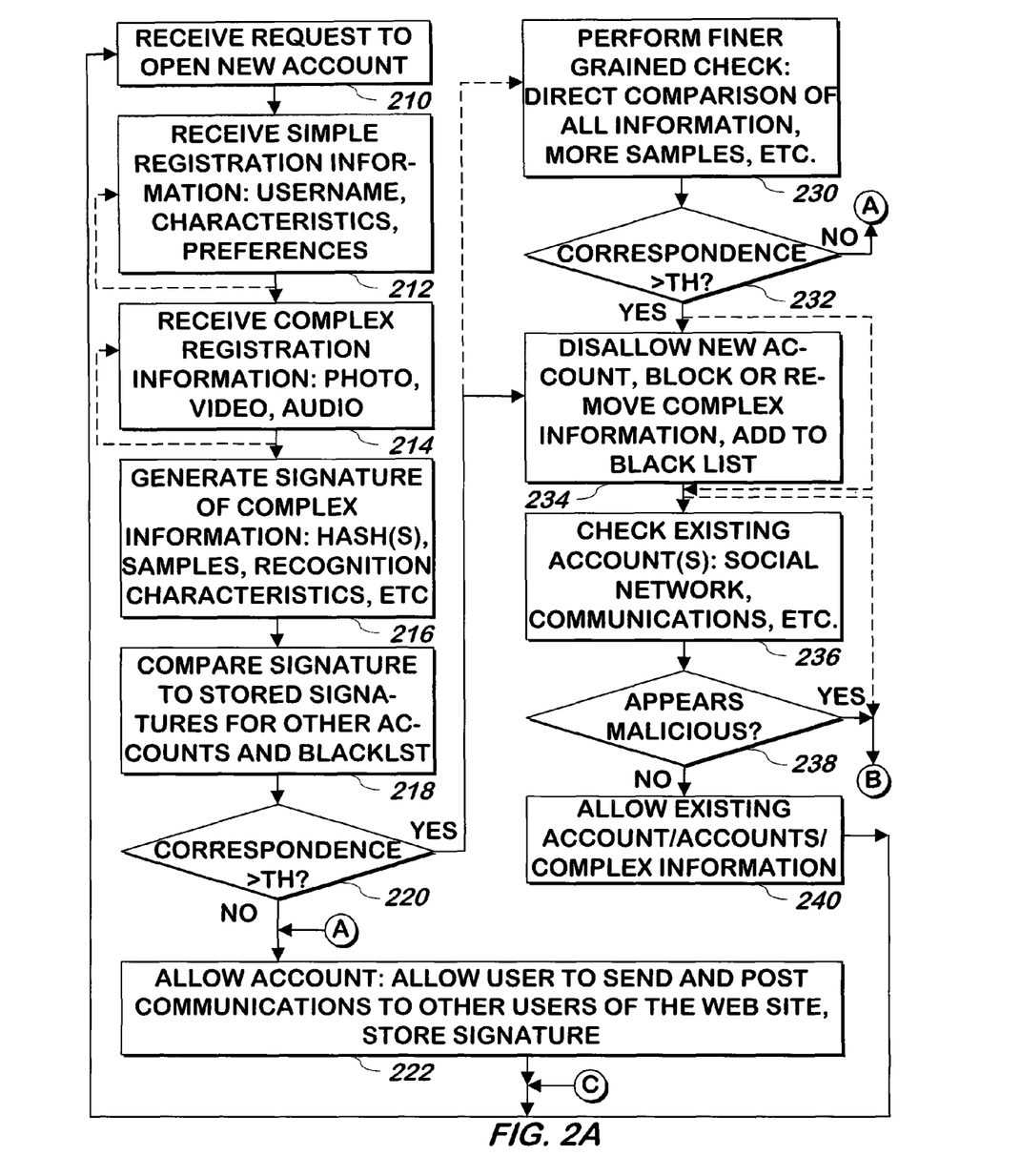
FIG. 2, consisting of FIGS. 2A and 2B, is a flowchart illustrating a method of registering users of a web site according to one embodiment of the present invention.
Figure 2B:
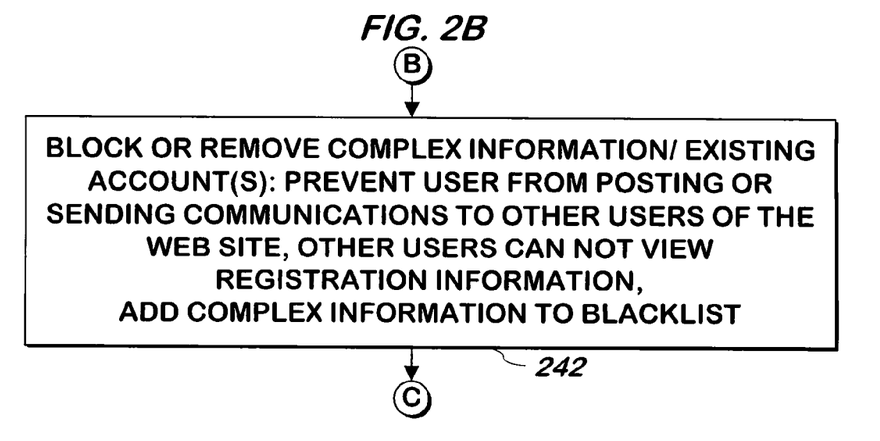

FIG. 2 is a flowchart illustrating a method for using signatures of complex information to identify fake or malicious accounts. Referring now to FIG. 2B, a request to open a new account is received 210. In one embodiment, the request to open the new account is received through a website that requires a user to register an account through the website.

Receive Simple Registration Information: Username, Characteristics, Preferences.

Simple registration information corresponding to the new user account is received 212 from the user. Simple registration information may be quickly and easily (i.e. within a fraction of a second using a conventional computer system) compared to other simple registration information, such as that associated with another user account, in order to determine whether information is identical. Simple registration may include information received in the form of text, such as a username and corresponding password, or user characteristics such as the location of the user's current residence, or user preferences, or any other registration information represented by a small amount of data. Simple registration information corresponding to a user account may be received from the user, or updated by the user, at any time, as indicated by the dashed lines in the Figure.

Receive Complex Registration Information: Photo, Video, Audio.

Complex registration information corresponding to the new user account is received 214. Complex registration information may include any registration information received from the user for which the simple method of comparison effective for comparing simple information above is not sufficient, or not possible, at least about as quickly as comparing simple information, to determine with certainty the level of correspondence between examples of complex registration information in a short amount of time. Examples of complex information include digital photographs, digital video or digital audio. Complex registration information, or updated complex registration information, corresponding to the user account may be received from the user at any time, as indicated by the dashed lines in the Figure.

Generate Signature of Complex Information: Hash(es), Samples, Recognition Characteristics, Etc.

A signature is generated 216 for some or all of the complex information provided by the user. The signature of a piece of complex information, such as a user profile picture or other digital photograph provided by the user, may be generated using any conventional technique that distills the large amount of data in the complex information into a smaller amount of signature data, such as by using one or more conventional hash techniques, sampling techniques (e.g. copying every $1000^{th}$ byte from the complex information into a sample), or more processing intensive techniques such as identifying characteristics such as those used in conventional facial or speech recognition, or any other techniques. In one embodiment, the signature for complex information represented by an array data structure, such as a digital photograph represented by an array of pixels (i.e. large amount of data), may be generated using conventional hash techniques to distill or map the array of pixels down to a hash value, which is a very small amount of data relative to the complex information used to generate it. Any number of signatures generated in this manner for a corresponding number of arrays may be compared to other generated signatures much more quickly and easily than the original arrays may be compared to each other. Other methods may be used to generate signatures such as identifying a corresponding sample set of pixels from each digital photograph, or identifying recognizable facial characteristics in the digital photograph, such as those that may be identifiable using conventional facial recognition methods, or any other methods for any other complex information.

Compare Signature to Stored Signatures for Other Accounts.

The signature or signatures generated for the user's complex registration information are compared to the signature(s) that have been previously generated using the same method and stored in association with each of some or all of the existing user accounts, and a level of signature correspondence for the new user account is determined based on the comparison 218. In one embodiment, the hash value for the user's digital photograph may correspond to a hash value that is already stored in association with an existing user account, and in such a case, the two signatures may be determined to have a high level of correspondence. In one embodiment, the level of signature correspondence may be determined as either corresponding or not corresponding, or the level of signature correspondence may be determined on a scale, such as a scale from of 0 to 20 with 0 indicating no correspondence and 20 indicating the highest level of correspondence. In one embodiment, multiple signatures may be generated and compared for a user's complex information (e.g. signatures for multiple digital photographs, or signatures for a digital photograph and a digital video), and in such a case, the level of signature correspondence may be determined as the highest level identified, as an average, or as a percentage of the number of signatures out of all the signatures generated for the new account that correspond highly to existing signatures, or a distinct level of signature correspondence may be determined for each piece of complex information, or the level or levels of signature correspondence may be determined in another manner.

In one embodiment, comparisons may be performed between the new account and only some of the existing accounts, such as those used by the user of the account within a first threshold number of days, or opened within a second threshold number of days, of the current date.

Allow Account.

If the level of signature correspondence for the new user account is determined to be below a signature correspondence threshold for all of the existing user accounts 220, the new account is allowed and the new signature(s) of complex information generated for the new user account are stored with the existing signatures for existing accounts 222. In one embodiment, the signature correspondence threshold is an upper limit threshold representing the maximum level of signature correspondence that is allowed for a new user account. In one embodiment, the signature correspondence threshold may be high on a signature correspondence scale (e.g. 15 on the scale of 0 to 20) indicating that a high level of signature correspondence is tolerated for new accounts, or it may be low on the correspondence scale (e.g. 5 on the same scale), indicating that a lower level of signature correspondence is tolerated for new accounts. In one embodiment, the level of signature correspondence tolerated for new user accounts may vary depending on the method used to generate signatures.

Perform Finer Grained Check: Direct Comparison of All Information, More Samples, etc.

If the level of signature correspondence between the new user account and any existing user account is above the signature correspondence threshold 220, indicating that some or all of the complex information provided by the user to register the new account may be identical or too similar to complex information corresponding to one or more existing accounts, then one or more finer-grained checks may be performed and a level of direct correspondence may be determined between the new user account and each such existing account 230, though in another embodiment, the method may optionally omit steps 230-232, as shown by the lines in the Figure, and continue at step 234.

The finer-grained check optionally performed in one embodiment at step 230 may be a direct comparison, or a more detailed comparison, of some or all of the complex information (i.e. the initial large amount of data, such as the original array of pixels for a digital photograph) for which the high level of signature correspondence was identified, such as a direct pixel by pixel comparison of a large, or larger, sample of pixels if the complex information includes digital photographs. Any number of finer grained checks may be performed. In one embodiment, the finer grained check is performed using only complex information corresponding to the specific existing account(s) that contributed to the high level of signature correspondence, or the finer grained check may be performed using complex information corresponding to any existing accounts, for example, by comparing each pixel in digital photographs. The level of direct correspondence may be determined using the complex information in a manner similar to the manner in which the level of signature correspondence is determined using signatures, and the level of direct correspondence is compared to a direct correspondence threshold.

If the level of direct correspondence for the new user account with any other such existing accounts is not greater than the permitted level of direct correspondence for new accounts 232, then the new user account is allowed as in step 222.

If the level of direct correspondence determined for the new user account with any such existing accounts exceeds the allowed level of direct correspondence 232, then the method continues below at step 234.

Disallow New Account.

At step 234, the new account registered by the user is disallowed. In one embodiment, disallowed accounts may not be used to post or send communications to registered accounts in the network through the network and may also not be able to view them.

New Content Received for an Existing Account May be Similarly Checked.

It is noted that, in the event that an existing user adds complex information, the complex information added will be checked against complex information of other users as described herein. In such event, the account to which complex information is added is treated as the "new account" and the user is treated as the "new user" described herein until steps 232 or 234. In one embodiment, the "yes" branch of 232 is followed by step 236, which is performed for the account treated as the "new" account, as well as any existing account for which the direct comparison identified at least a threshold level of correspondence, and any of such accounts determined to be malicious are blocked or removed as described above.

Check Existing Account: Social Network, Communications, etc.

The existing account or accounts corresponding to the stored signature(s) which share a high level of signature correspondence with the new account, or corresponding to the complex information that shares a high level of direct correspondence with the new account, are checked and a determination is made whether the existing account(s) are malicious 238. In one embodiment, a malicious account may be an account set up and/or being used for malicious intent, such as to make available or set up spam type communications or other malicious type communications. In one embodiment, the existing account(s) identified as possibly malicious may be checked using a number of methods, including checking the communications sent or posted from the identified account(s) for similarity with other communications sent from that account or for the presence of certain keywords, or a human may optionally investigate the account(s) manually. In one embodiment, social networking information corresponding to the user requesting to register an account, as well as social networking information corresponding to the user's friends on the social network, may be checked as described in U.S. Provisional Patent Application 61/626,828 entitled "Method and Apparatus for Validating Users Using Social Network Information" filed by Alexander Mehr and Shayan Zadeh on Oct. 3, 2011, having the same assignee as the present application and hereby incorporated by reference in its entirety.

Allow Existing Account.

If an existing account checked in the manner described above is determined not to be a malicious account 238, the existing account is allowed 240. In one embodiment, allowed accounts on the website may be used to post and/or send communications to other accounts that are also allowed on the website.

Remove Existing Account.

If an existing account checked in the manner described above is determined to be a malicious account 238, the existing account may be removed or blocked 242. In one embodiment, an existing account identified as malicious may be permanently removed and no communications may be posted or sent using the account, or the account may be blocked in a similar manner until the account can be otherwise verified as not a malicious account, such as by waiting to be contacted by the owner of the account. A blocked or removed account on the website may not be used to send or post communications to other accounts on the website, nor will registration information of the blocked or removed account be visible to other users of the website.

In one embodiment, the steps performed above are performed on a server coupled to a network. Users communicate with the server using computer systems such as conventional personal computer systems or cellular telephones via a browser or an application running on the cellular telephone.

Only Corresponding Complex Information May be Removed or Blocked.

In one embodiment, steps 234 and/or 232 may involve blocking or removing only the complex information identified as corresponding instead of blocking or removing the account or accounts, which may then be used to communicate with other users except for the blocked complex information. In one embodiment, blocking or removing the corresponding complex information is performed unconditionally, without performing steps 236 or 238.

A Black List of Complex Information and Signatures May be Maintained.

In one embodiment, steps 234 and 242 include adding the complex information and/or signature to a blacklist of complex information and/or signatures of complex information that met or exceeded the threshold correspondence as described above. In such embodiment, the comparison performed in steps 218 and 230 may also compare the complex information received or the complex information of the new account to the signatures and complex information on the blacklist in addition to performing the comparisons as described above. If located on the blacklist, further comparisons with complex information of existing accounts may not be performed in one embodiment, such as if the complex information is being added to an existing account.

In one embodiment, different thresholds may be used when comparing signatures or complex information from the blacklist than are used when comparing signatures or complex information from other user accounts. For example, the threshold for complex information from user accounts may be higher than complex information from the blacklist.

Different actions may be performed when the threshold or greater correspondence is from the blacklist than are performed with the correspondence is with complex information from an existing user account and different actions may be performed when the threshold or greater correspondence is with a new account than it is when content is added to an existing account. For example, the user who has the new account or is adding content to an existing account may have the content blocked if the greater than threshold correspondence is on the blacklist, but the account may be blocked if the greater than threshold correspondence is with another user, or vice versa. A new user who supplies content that has a greater than threshold correspondence with an existing account may have the new account blocked, but a user who adds content to an existing account may have only the content with a greater than threshold correspondence blocked, but the account itself may continue to be allowed. In one embodiment, content blocked or removed may not be seen or posted to other users.

In one embodiment, the actions performed may be a function of prior actions of the user. For example, each time complex information of a user is blocked or removed, a counter associated with that user's account is incremented, and if the counter exceeds a threshold, the user's account is blocked or removed.

System.

Figure 3:
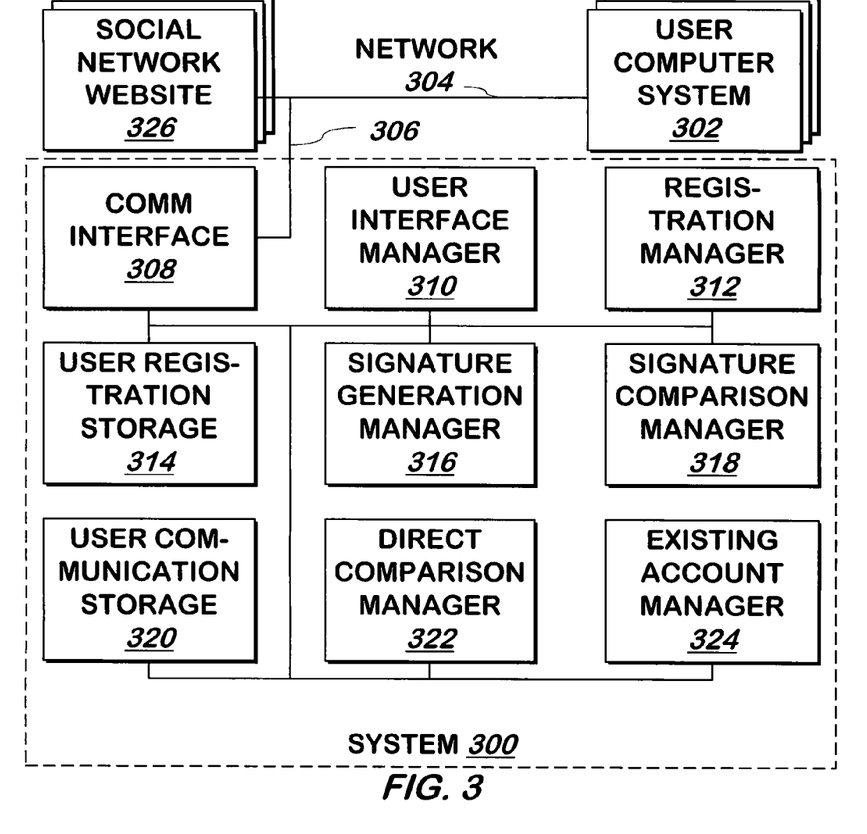
FIG. 3 is a block schematic diagram of a system for registering users of a web site according to one embodiment of the present invention.

FIG. 3 is a block schematic diagram of a system for using signatures to identify and disallow malicious accounts according to one embodiment of the present invention. Referring now to FIG. 3, a user requests to register a new account, or logs in and requests to edit an existing account, such as by clicking a new account link or an edit account link on a webpage provided by user interface manager 310. Registration manager 312 receives the request to register the new account or edit an existing account (and the user identifier of the account from user interface manager 310), builds a web page containing suitable user interface elements that allow the user to provide simple registration information, as described above, and returns it to the user's browser in response. The user fills out the web page with simple registration information, including a username and password and any other simple information required or useful to register a new account. When registration manager 312 receives the simple registration information, registration manager 312 stores such information associated with a unique user identifier in user registration storage 314. In one embodiment, if the account is new, registration manager 312 obtains the current date and time from an operating system (not shown) and stores the date and time associated with the user identifier in user registration storage 314.

In one embodiment, all communication into and out of server 300 is made via input/output 306 of communication interface 308 which may be a TCP-IP compatible communication interface running suitable communications protocols such as TCP/IP, Ethernet, or both. Input/output 306 may be coupled to an Ethernet network, the Internet, or both.

In one embodiment, user registration storage 314 and any other storage may include conventional memory or disk storage and may include a conventional database, or other searchable table of information. In one embodiment, each row of the database may correspond to a user account, indexed by a user identifier.

Registration manager 312 may also build a web page, or build one or more new web pages, with suitable user interface elements that allow the user to provide complex registration information, as described above, and return it to the user's browser in response. The user interface elements provided by registration manager 312 may include any conventional uploading tool. The user fills out the web page with complex registration information, such as the file name or location of digital photographs, digital videos or digital audio files on the user's computer 302, and the web page uploads the complex information via network 304 to registration manager 312, which receives it. When registration manager 312 receives the complex registration information, such as one or more digital photographs or profile pictures, video, or audio files, registration manager 312 stores the complex registration information associated with the user identifier in user registration storage 314 and provides the user identifier corresponding to the new account to signature generation manager 316. In one embodiment, registration manager 312 may store complex information indexed by the type or types of information provided.

In one embodiment, when a user registers or logs in, registration manager 312 stores the current date an time in user registration storage 314 associated with the user identifier of that user.

When signature generation manager 316 receives the user identifier from registration manager 312, it retrieves from user registration storage 314 complex registration information associated with the user identifier it received and generates one or more signatures for the retrieved complex registration information as described above, and sends the generated signature(s), along with the received user identifier, to signature comparison manager 318.

Signature comparison manager 318 receives the user identifier and user signature(s) from signature generation manager 316, compares the received user signature(s), as described above, to existing signatures corresponding to some or all of the existing accounts stored in user registration storage 314 as described above, and identifies any existing signatures from user registration storage 314 that share a high level of correspondence with the received user signature. In one embodiment, signature comparison manager 318 determines the level of signature correspondence between any existing signature and the received user signature in the manner described above, and identifies existing signatures with a greater-than-threshold level of correspondence with the received user signature, as described above. In one embodiment, signature comparison manager 318 obtains the current date from an operating system or from user registration storage 314 associated with the user identifier it receives and uses the date associated with such existing accounts assigned when the accounts were new as described above to identify the existing accounts with which such comparisons are made. In one embodiment, in addition to such accounts, signature comparison manager also uses the black list of known bad user information that consists of blocked accounts or restricted user information identified in user registration storage 314 as described herein and compares with all information in such accounts or the restricted information in such accounts, in addition to or instead of the accounts opened within a threshold period of time between the date of the account whose identifier it receives or the current date, as described above.

If signature comparison manager 318 does not identify any existing signatures in user registration storage 314 that share a at least a threshold level of signature correspondence with the received user signature, it stores the received user signature(s) in user registration storage 314 associated with the received user identifier and marks the user account associated with the received user identifier as allowed in user registration storage 314, which enables the user to send or post communications with other users of the web site provided by system 300 and allows other users to view that user's registration information and any other information about that user.

If signature comparison manager 318 identifies one or more existing signatures in user registration storage 314 that share at least a threshold level of signature correspondence with any of the signature(s) received for the new account, as described above, signature comparison manager 318 identifies the existing account(s) associated with such existing signature(s) in user registration storage 314 and marks such existing accounts as having such signature correspondence. In one embodiment, signature comparison manager 318 may mark the existing account(s) by storing in user registration storage 314 the user identifier corresponding to the new account with which the existing account(s) share the threshold or higher level of signature correspondence.

In one embodiment, signature comparison manager 318 also stores into user registration storage 314, associated with the existing account, identifiers of the complex information of the new account and the existing account that had the correspondence identified.

In one embodiment, signature comparison manager 318 may send the user identifier corresponding to the new account with at least the threshold level of signature correspondence to direct comparison manager 322, in another embodiment, signature comparison manager 318 may mark the new account with at least the threshold level of signature correspondence as disallowed in user registration storage 314 and send the user identifier corresponding to the disallowed new account to existing account manager 324, as described below.

When direct comparison manager 322 receives the user identifier from signature comparison manager 318, direct comparison manager 322 identifies the existing accounts in user registration storage 314 marked with the received user identifier, or otherwise indicated as sharing at least the threshold level of signature correspondence with the new account corresponding to the received user identifier. For any existing account marked as such, direct comparison manager 322 identifies and/or retrieves the complex information of the existing account identified by signature comparison manager 318, as described above, as well as the complex information of the new account corresponding to the received user identifier, directly compares the identified existing account complex information with its corresponding new account complex information, for example by performing a direct pixel by pixel comparison of two digital photographs, as described above, and identifies any existing complex information that shares a high level of direct correspondence with its linked complex information. In one embodiment, direct comparison manager 322 determines the level of direct correspondence between existing account complex information and its corresponding new account complex information in the manner described above.

If direct comparison manager 322 does not identify a threshold level of correspondence between the existing account complex information indicated in user registration storage 314 with complex information in the new account that had a high threshold level of signature correspondence, it marks the user account associated with the received user identifier as "allowed" in user registration storage 314. In one embodiment, direct comparison manager 322 may delete any marks previously made by signature comparison manager 318 corresponding to the user identifier in user registration storage 314.

If direct comparison manager 322 identifies a threshold level of correspondence between the existing account complex information indicated in user registration storage 314 with complex information in the new account that had a threshold level of signature correspondence, as described above, direct comparison manager 322 removes the account or marks the new user account corresponding to the received user identifier as disallowed or blocked, or removes the corresponding content or marks it as blocked in the new account or both accounts in user registration storage 314. Additionally, direct comparison manager 322 may mark the existing account(s) identified as having the threshold or higher level of direct correspondence in user registration storage 314 with the user identifier corresponding to the new account with which the existing account(s) share the threshold or higher level of direct correspondence and send the user identifier of the disallowed new account to existing account manager 324. In one embodiment, direct comparison manager 322 may overwrite and/or delete marks previously made by signature comparison manager 318 corresponding to the user identifier in user registration storage 314.

In one embodiment, direct comparison manager 322 or signature comparison manager 318 copies into a blacklist table in user information storage 314 the signature and the complex information for which the correspondence exceeds the threshold that is not already in the table. Signature comparison manager 318 and direct comparison manager 322 also compare the new user's content (or an existing user's additional content) with the signatures and the complex information in the blacklist table when checking for correspondence as described above.

When existing account manager 324 receives the user identifier for a disallowed new account from direct comparison manager 322, or from signature comparison manager 318 as described above, existing account manager 342 checks the existing account(s) marked as having a high level of direct or signature correspondence with the disallowed new account corresponding to the received user identifier, as described above, and determines whether the existing account or accounts are malicious accounts, including accounts set up and/or being used for malicious intent, such as to make available or set up spam type communications or other malicious type communications. In one embodiment, to check the existing accounts and identify malicious accounts, such as by retrieving any user communication information from user communication storage 320 to check the communications sent or posted from the identified account(s) for similarity with other communications sent from that account, or by retrieving any malicious keyword information from malicious keywords storage 328 to check for the presence of certain keywords, or by retrieving any social networking information corresponding to the user or the user's friends on a social networking website from social network website 326 as described in the related application. The malicious keywords (e.g. "viagra," "wh*re," etc.) are supplied by a system administrator to system administrator manager 330, which stores them into malicious keywords storage 328. User communication storage 320 may include conventional memory or disk storage and may include a conventional database.

If existing account manager 324 determines that an existing account is malicious, it marks the account in user registration storage 314 as blocked or disallowed. In one embodiment, existing account manager 324 may remove or delete the account from user registration storage 314 or existing account manager 324 may mark the account as blocked or disallowed.

If existing account manager 324 determines that an existing account is not malicious, then existing account manager 324 may leave the account marked as allowed in user registration storage 314. In one embodiment, existing account manager 324 may delete any marks indicating a high level of signature correspondence, or direct correspondence, or both, which are associated with the user identifier for the disallowed account in user registration storage 314.

In one embodiment, the user may send or post communications to other users of system 300 via user interface manager 310 if the account is not blocked or disallowed. As such communications are sent or posted, user interface manager 310 may store all communications posted or sent by any account in user communication storage 320 associated with the user identifier corresponding to the account. User interface manager 310 may allow communications to be posted or sent from any account marked as allowed in user registration storage 314, and may also allow registration information associated with an allowed account to be viewed by other allowed accounts, as described above.

User interface manager 310 does not allow any communications to be posted or sent from any account marked as blocked or removed or disallowed in user registration storage 314, nor does it allow registration information associated with blocked or removed account to be visible to other accounts.

User interface manager 310 may display to other users of the web site operated by system 300 complex registration information of an allowed, not blocked, not removed account if the complex registration information is not blocked, disallowed or removed.

What is claimed is:

1. A method of providing communications privileges to a first user account, comprising:
 receiving information for the first user account;
 transforming the information for the first user account to produce a first transformation that is different from the information for the first user account;
 receiving information for a second user account;
 transforming the information for the second user account to produce a second transformation that is different from the information for the second user account;
 comparing the first transformation with the second transformation; and
 configuring at least one computing device to perform a function of disallowing communication between the first user account with at least one other user account, responsive to the comparing.

2. The method of claim 1:
 additionally comprising comparing the information for the first user account with the information for the second user account responsive to the comparing the first transformation step; and
 wherein the disallowing communication step is additionally responsive to the comparing the information step.

3. The method of claim 1, additionally comprising storing the first transformation and the second transformation as known bad information responsive to the comparing step.

4. The method of claim 1:
additionally comprising investigating content of at least one communication of the second user account responsive to the comparing step; and
wherein, the disallowing communication between the first user account and the at least one other user account is responsive to the investigating step.

5. The method of claim 1, wherein the disallowing communication step is additionally responsive to at least one action performed by a user corresponding to the first user account prior to the receiving the information from the first user account step.

6. The method of claim 1, wherein the comparing step is responsive to the second user account having been opened within a threshold period of time of an opening of the first user account.

7. The method of claim 1, wherein the disallowing communication step comprises disallowing communication of the information transformed, but not disallowing other information received for the first user account.

8. A system for providing communications privileges to a first user account, comprising:
a registration manager having an input for receiving information for the first user account and information for a second user account, the registration manager for providing at an output the information for the first user account and the information for the second user account received at the registration manager input;
a signature generation manager having an input coupled to the registration manager output for receiving the information for the first user account and the information for the second user account, the signature generation manager for transforming the information for the first user account received at the signature generation manager input to produce a first transformation that is different from the information for the first user account, and for transforming the information for the second user account received at the signature generation manager input to produce a second transformation that is different from the information for the second user account, and for providing at an output the first transformation and the second transformation;
a signature comparison manager having an input coupled to the signature generation manager output for receiving the first transformation and the second transformation, the signature manager for comparing the first transformation with the second transformation and providing at an output an indication of at least similarity, responsive to the comparison; and
a user interface manager having an input coupled to the signature comparison manager output for receiving the indication, and for receiving at least one set of information to be communicated from the first user account to at least one other user account, the user interface manager for disallowing communication of said at least one set of information between the first user account with at least one other user account, responsive to the indication received at the user interface manager input.

9. The system of claim 8:
additionally comprising a direct comparison manager having an input coupled to the registration manager output for receiving the information for the first user account and the information for the second user account and to the signature comparison manager output for receiving the indication, the direct comparison manager for comparing the information for the first user account with the information for the second user account, responsive to the indication received at the direct comparison manager input, and providing at an output an indication of said comparison; and
wherein the user interface manager input is additionally coupled to the direct comparison manager output for receiving the indication from the direct comparison manager output, and the user interface manager disallows communication additionally responsive to the indication received from the direct comparison manager output.

10. The system of claim 8, wherein the signature comparison manager is additionally for storing via the signature comparison manager output the first transformation and the second transformation as known bad information responsive to the comparing.

11. The system of claim 8:
additionally comprising an existing account manager having an input for receiving at least one communication from the second user account and coupled to the signature comparison manager output for receiving the indication, the existing account manager for investigating content of at least one communication of the second user account responsive to the indication received at the existing account manager input and providing at an output an indication of a result of said investigating; and
wherein the user interface manager input is additionally coupled to the existing account manager output for receiving the indication of the result, and the user interface manager disallows communication between the first user account and the at least one other user account responsive to the indication of the result.

12. The system of claim 8:
additionally comprising an existing account manager having an input for receiving information about at least one action performed by a user corresponding to the first user account prior to the receiving the information from the first user account, and coupled to the signature comparison manager output for receiving the indication, the existing account manager for investigating content of at least one communication of the second user account responsive to the indication received at the existing account manager input and providing at an output an indication of a result of said investigating; and
wherein the user interface manager input is additionally coupled to the existing account manager output for receiving the indication of the result, and the user interface manager disallows communication between the second user account and the at least one other user account additionally responsive to the indication of the result.

13. The system of claim 8, wherein the signature comparison manager receives the information for the second user account responsive to the second user account having been opened within a threshold period of time of an opening of the first user account.

14. The system of claim 8, wherein the at least one set of information user interface manager disallows communication comprises at least some of the information transformed, but not other information received for the first user account.

15. A computer program product comprising a non-transitory computer useable medium having computer readable program code embodied therein for providing communications privileges to a first user account, the computer program product comprising computer readable program code devices configured to cause a computer system to:

receive information for the first user account;
transform the information for the first user account to produce a first transformation that is different from the information for the first user account;
receive information for a second user account;
transform the information for the second user account to produce a second transformation that is different from the information for the second user account;
compare the first transformation with the second transformation; and
disallow communication between the first user account with at least one other user account, responsive to the computer readable program code devices configured to cause the computer system to compare.

16. The computer program product of claim 15:
additionally comprising computer readable program code devices configured to cause the computer system to compare the information for the first user account with the information for the second user account responsive to the computer readable program code devices configured to cause the computer system to compare the first transformation; and
wherein the disallowing communication step is additionally responsive to the computer readable program code devices configured to cause the computer system to compare the information.

17. The computer program product of claim 15, additionally comprising computer readable program code devices configured to cause the computer system to store the first transformation and the second transformation as known bad information responsive to the computer readable program code devices configured to cause the computer system to compare.

18. The computer program product of claim 15:
additionally comprising computer readable program code devices configured to cause the computer system to investigate content of at least one communication of the second user account responsive to the computer readable program code devices configured to cause the computer system to compare; and
wherein the computer readable program code devices configured to cause the computer system to disallow communication between the first user account and the at least one other user account are responsive to the computer readable program code devices configured to cause the computer system to investigate.

19. The computer program product of claim 15, wherein the computer readable program code devices configured to cause the computer system to disallow communication are additionally responsive to at least one action performed by a user corresponding to the first user account prior to the receiving the information from the first user account.

20. The computer program product of claim 15, wherein the computer readable program code devices configured to cause the computer system to compare are responsive to the second user account having been opened within a threshold period of time of an opening of the first user account.

21. The computer program product of claim 15, wherein the computer readable program code devices configured to cause the computer system to disallow communication comprise computer readable program code devices configured to cause the computer system to disallow communication of the information transformed, but not disallow other information received for the first user account.

\* \* \* \* \*